(No Model.)

R. S. BROWN.
UNIVERSAL COUPLING.

No. 481,780. Patented Aug. 30, 1892.

Witnesses
Brayton S. Lewis
E. Darwin Loomis Jr.

Inventor
Robert S. Brown
By James Shepard
Atty

UNITED STATES PATENT OFFICE.

ROBERT S. BROWN, OF NEW BRITAIN, CONNECTICUT, ASSIGNOR OF ONE-HALF TO F. G. PLATT, OF SAME PLACE.

UNIVERSAL COUPLING.

SPECIFICATION forming part of Letters Patent No. 481,780, dated August 30, 1892.

Application filed May 20, 1892. Serial No. 433,758. (No model.)

*To all whom it may concern:*

Be it known that I, ROBERT S. BROWN, a citizen of the United States, residing at New Britain, in the county of Hartford and State of Connecticut, have invented a certain new and Improved Universal Coupling, of which the following is a specification.

My invention relates to improvements in universal shaft-couplings; and the objects of my improvement are simplicity of construction and general efficiency, especially in providing a coupling that may be used between two shafts which are out of alignment.

Figure 1:
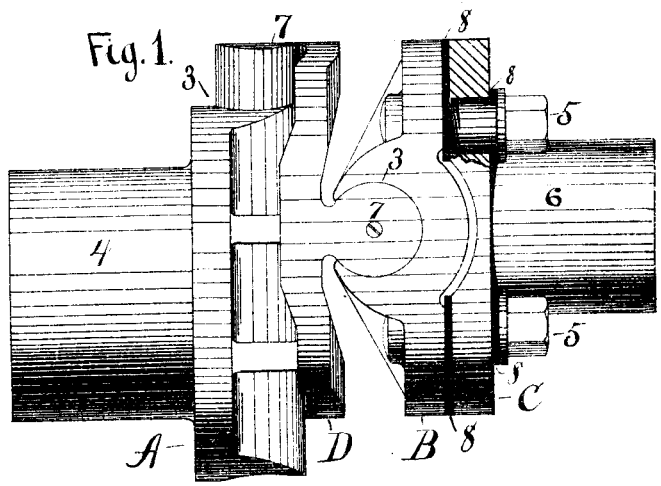
Figure 2:
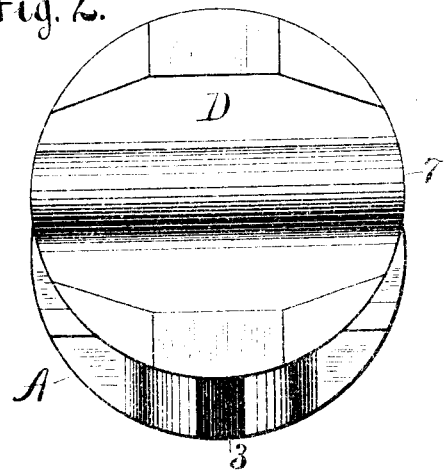

In the accompanying drawings, Figure 1 is a side elevation of my coupling, partly in section, and Fig. 2 is an end or face view of parts thereof.

My coupling is especially designed for use between two machines or two parts of a shaft that are liable to work out of alignment—as, for instance, between a steam-engine and a dynamo.

A designates a head, preferably in disk-like form and having on one face a circular socket 3, extending transversely to its axis, while its opposite sides are provided with a suitable hub 4 or means for connecting it with any desirable shaft. A similar head B is on the other side of the coupling, one side of which is provided with a like transverse socket 3, the same as in the head before described, said socket being circular in the transverse section and open on one side from end to end. Instead of connecting this head B directly to the shaft or hub I secure it to the disk or sub-head C by means of bolts 5 and with a sheet of insulating material 8 between said disk and head and around the bolts, said disk or sub-head being provided with a hub 6 or any ordinary devices for attachment to a shaft. This insulation, however, will be used only in connection with a dynamo or analogous uses, and if my coupling is to be used otherwise the head B may be provided with a hub for connecting it directly to the shaft. I prefer to employ the sub-head whether used with an insulator or not, as it enables the coupling to be removed from the shafts without moving the shafts themselves.

Between the heads A and B is a middle head D, having transverse ribs or projections 7, extending transversely to the axis of said head and at right angles to each other. These ribs or projections in transverse section are mainly cylindrical, but connected to the body of the middle head by a narrow neck, so that they may be slipped endwise into the sockets of the heads and be free to move longitudinally therein, while the neck being narrower than the open mouth of the socket permits them to have a rocking motion within said socket, as on a hinge. The form of this socket and rib in end view is best shown at the middle portion of Fig. 1.

In use my invention will permit of a rocking motion of the heads A B upon the middle head D, so that the coupling may be used upon shafts which meet each other at an angle. At the same time the sliding motion of the ribs or projections 7 within the socket 3 will permit the coupling to be used between two shafts whose confronting ends are in different planes.

While I have described the sockets as formed upon the heads A and B of the transverse ribs or projections on the opposite sides of the middle head D, it is evident that the operation would be the same if the position of the parts were reversed, and such reversal is considered an obvious variation.

I am aware that a prior patent shows a coupling consisting of two heads with a middle head between, the same being jointed, so as to rock transversely, but without any provision for a sliding motion of the ribs within the sockets, and I hereby disclaim the same.

I claim as my invention—

1. The herein-described universal coupling, consisting of the heads A and B, each provided with transverse sockets of a circular form in cross-section, and the middle head D, provided with transverse ribs or projections fitted in said sockets and left free to move longitudinally therein and also to rock, as on a hinge, substantially as described, and for the purpose specified.

2. In a universal coupling, the socket-head B, adapted to be coupled to a companion head on a different shaft, the sub-head C for connecting said socket-head with its shaft, and an insulating material 8, interposed between said head and sub-head, substantially as described, and for the purpose specified.

3. A coupling consisting of the heads A and B, having transverse sockets, a sub-head for connecting one of said heads with a shaft, and the middle head D, provided with transverse ribs or projections fitted in said sockets, substantially as described, and for the purpose specified.

ROBERT S. BROWN.

Witnesses:
 FREDK. A. BASSETTE,
 STEPHEN R. LAWRENCE.